(12) United States Patent
Capoldi

(10) Patent No.: US 12,247,612 B2
(45) Date of Patent: Mar. 11, 2025

(54) ROLLING BEARING, NOTABLY LARGE-DIAMETER ROLLING BEARING

(71) Applicant: Aktiebolaget SKF, Gothenburg (SE)

(72) Inventor: Bruno Capoldi, Charentenay (FR)

(73) Assignee: Aktiebolaget SKF, Gothenburg (SE)

( * ) Notice: Subject to any disclaimer, the term of this patent is extended or adjusted under 35 U.S.C. 154(b) by 25 days.

(21) Appl. No.: 17/971,569

(22) Filed: Oct. 22, 2022

(65) Prior Publication Data

US 2023/0160421 A1    May 25, 2023

(30) Foreign Application Priority Data

Nov. 24, 2021   (DE) .......................... 102021213235.9

(51) Int. Cl.
*F16C 19/38* (2006.01)
*F16C 19/50* (2006.01)

(52) U.S. Cl.
CPC .......... *F16C 19/381* (2013.01); *F16C 19/505* (2013.01); *F16C 2300/14* (2013.01)

(58) Field of Classification Search
CPC ... F16C 19/381; F16C 19/505; F16C 2300/14
See application file for complete search history.

(56) References Cited

U.S. PATENT DOCUMENTS

| | | | |
|---|---|---|---|
| 9,605,709 B2 * | 3/2017 | Kaesler | F16C 33/6659 |
| 9,784,308 B2 * | 10/2017 | Fiesel | F16C 19/49 |
| 11,767,881 B2 | 9/2023 | Capoldi | |

FOREIGN PATENT DOCUMENTS

JP             11-153132        *   6/1999

\* cited by examiner

*Primary Examiner* — James Pilkington
(74) *Attorney, Agent, or Firm* — GARCIA-ZAMOR INTELLECTUAL PROPERTY LAW, LLC; Ruy Garcia-Zamor

(57) ABSTRACT

A rolling bearing provides a first ring and a second ring capable of rotating concentrically relative to one another, at least one row of radial rolling elements radially interposed between raceways of the rings, and at least one row of axial rolling elements axially interposed between raceways of the rings. The rolling bearing further provides, axially on each side, at least one row of rolling elements radially interposed between raceways of the first and second rings.

7 Claims, 4 Drawing Sheets

ROLLING BEARING, NOTABLY LARGE-DIAMETER ROLLING BEARING

CROSS-REFERENCE TO RELATED APPLICATIONS

This application claims priority to German Patent Application no. 102021213235.9, filed Nov. 24, 2021, the contents of which is fully incorporated herein by reference.

TECHNICAL FIELD OF THE INVENTION

The present invention relates to the field of bearings. The invention notably relates to the field of large-diameter rolling bearings that can accommodate axial and radial loads, and having an inner ring and an outer ring arranged concentrically about an axis of rotation running in an axial direction.

Such large-diameter rolling bearings may be used for example in a tunnel boring machine, in a mining extraction machine, in a big offshore crane or in a wind turbine.

A large-diameter rolling bearing comprises generally two concentric inner and outer rings, and a bearing assembly comprising two rows of axial rollers and one row of radial rollers. Such rolling bearings are generally loaded, both axially and radially, often with a relatively strong load.

Depending on the use of roller bearing, considerable titling moments may arise, which may cause deformation of the bearing, notably of the rotating ring, leading in some cases, to locally separate the rings. As a matter of fact, a radial gap between rotating ring and fixed ring of the roller bearing can be created.

One aim of the present invention is to overcome this drawback.

SUMMARY OF THE INVENTION

The invention relates to a rolling bearing comprising a first ring and a second ring capable of rotating concentrically relative to one another, at least one row of radial rolling elements radially interposed between raceways of the rings, and at least one row of axial rolling elements axially interposed between raceways of the rings.

The terms "axial rolling elements" is understood to mean rolling elements adapted to accommodate axial loads only whereas the terms "radial rolling elements" is understood to mean rolling elements adapted to accommodate radial loads only.

According to a general feature, the rolling bearing also comprises, axially on each side, at least one row of rolling elements radially interposed between raceways of the first and second rings.

With such an arrangement, if a tilting moment acts on the rolling bearing in the clockwise or counterclockwise direction, these rows of rolling elements prevent an angular displacement of the second ring relative to the first ring. Otherwise, these rows of rolling elements increase the rigidity of the rolling bearing.

The rolling bearing may comprise at least a first row of rolling elements arranged axially between the row of axial rolling elements and first frontal faces of the first and second rings, and at least a second row of rolling elements axially located between the row of radial rolling elements and second opposite frontal faces of the first and second rings.

In one embodiment, the rolling bearing further comprises at least one additional row of axial rolling elements axially interposed between raceways of the first and second rings, the rows of axial rolling elements being spaced apart from each other in the axial direction.

The second row of rolling elements may be axially located between the additional row of axial rolling elements and the second opposite frontal faces of the first and second rings.

In one embodiment, the second ring may comprise a protruding nose engaged into an annular groove of the first ring and provided with an axial cylindrical surface onto which is formed the raceway of the second ring. In this case, if the rolling bearing comprises the additional row of axial rolling elements, the additional row and the row of axial rolling elements are disposed axially on each side of the protruding nose of the second ring.

In one embodiment, each row of rolling elements is radially offset with respect to the row of axial rolling elements on the side opposite to the row of radial rolling elements.

Each row of rolling elements may comprise radial cylindrical rollers.

Each row of rolling elements may be located axially between shoulders of the first and second rings. In one embodiment, the first ring is provided with at least one plug extending into an orifice formed on the first ring and provided with an end face which is flush with one of the radial shoulders of the first ring.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The present invention and its advantages will be better understood by studying the detailed description of specific embodiments given by way of non-limiting examples and illustrated by the appended drawings on which.

DETAILED DESCRIPTION OF THE INVENTION

Figure 1:
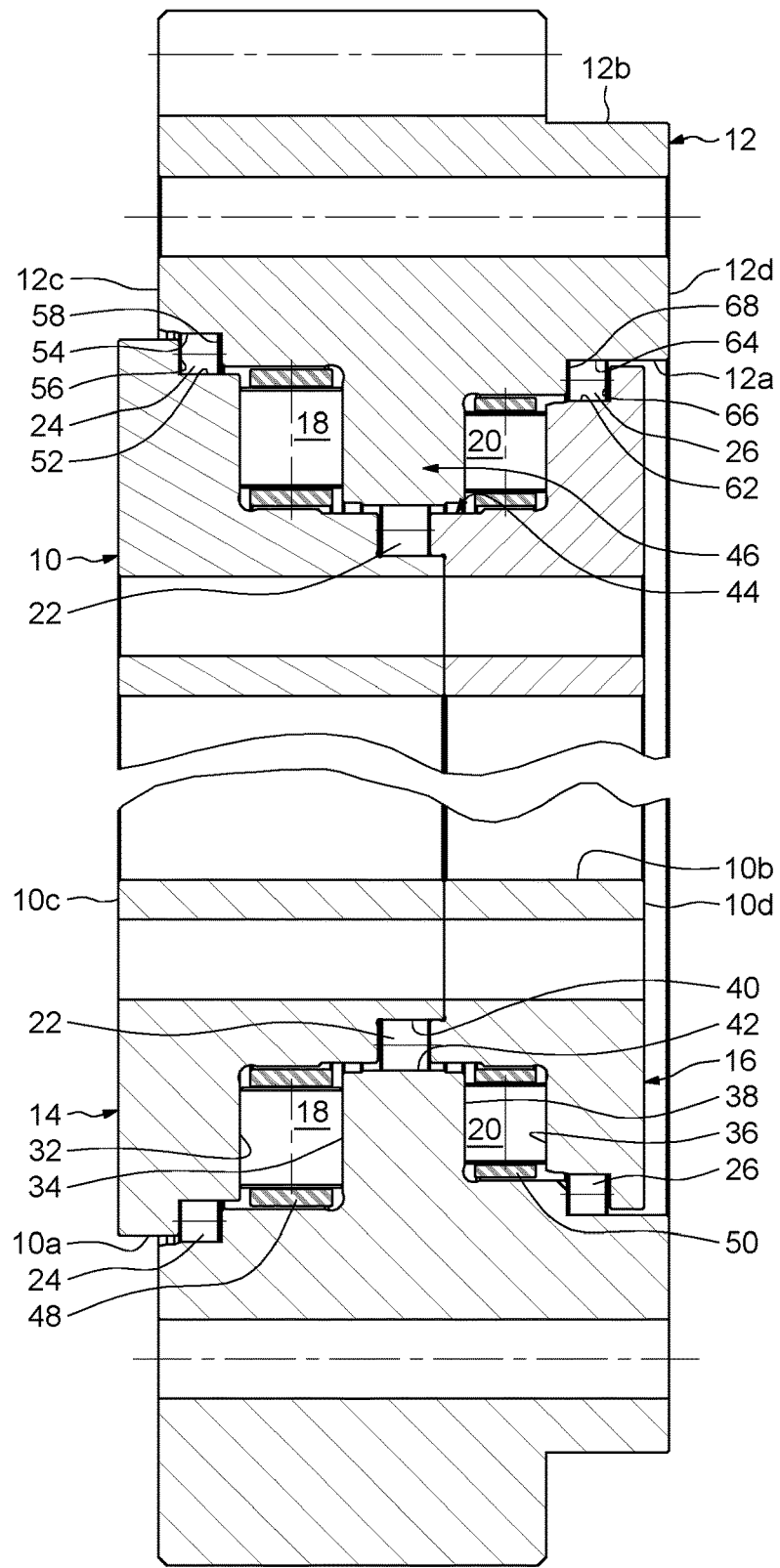
FIG. 1 is a cross-section of a rolling bearing according to an example of the invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. The rolling bearing as illustrated on FIG. 1 is a large-diameter rolling bearing comprising a first ring 10 and a second ring 12. In the illustrated example, the first ring 10 is the inner ring whereas the second ring 12 is the outer ring. In this example, the outer ring 12 is a rotative ring and the inner ring 10 is a non-rotative ring. The rolling bearing may for example be used in a tunnel boring machine, a wind turbine, a big offshore crane or any other applications using a large diameter rolling bearing.

The inner and outer rings 10, 12 are concentric and extend axially along the bearing rotation axis (not shown) which runs in an axial direction. The rings 10, 12 are of the solid type.

The inner ring 10 is formed as a split ring and comprises a first ring 14 and a second ring 16 stacked one relative to the other in the axial direction. Each of the first and second rings 14, 16 of the inner ring is provided with a plurality of aligned through-holes (not referenced) in order to be joined by fitting bolts.

In the illustrated example, the rolling bearing comprises first and second rows of axial rollers 18, 20 which are arranged between the inner and outer rings 10, 12 in order to form an axial thrust, and a row of radial rollers 22 arranged between the rings to form a radial thrust.

As will be described later, the rolling bearing further comprises, on each side, one row of radial rollers 24, 26 arranged between the inner and outer rings 10, 12.

The rollers 18, 20, 22 of one row are identical to one another. Each roller 18, 20, 22 comprises a cylindrical outer rolling surface. Each roller 18, 20, 22 further comprises two opposite frontal end faces delimiting the outer rolling surface.

The axis of rotation of each roller 22 is parallel to the axis of the bearing and perpendicular to the axes of the rollers 18, 20. In the illustrated example, the axial length of the rollers 18 is larger than the one of the rollers 20. Alternatively, the axial length of the rollers 18 may be smaller than, or may be equal to, the one of the rollers 20. Alternatively, the row of rollers 18 may be replaced by two rows of superimposed rollers.

The axial rollers 18 are interposed axially between annular radial raceways 32, 34 respectively formed on the inner and outer rings 10, 12. The raceways 32, 34 face each other in the axial direction. The rolling surface of each axial roller 18 is in axial contact with the raceways 32, 34.

The axial rollers 20 are interposed axially between annular radial raceways 36, 38 respectively formed on the inner and outer rings 10, 12. The raceways 36, 38 axially face each other. The rolling surface of each axial roller 20 is in axial contact with the raceways 36, 38. The rows of axial rollers 18, 20 are spaced apart from each other in the axial direction.

The radial rollers 22 are interposed radially between annular axial raceways 40, 42 respectively formed on the inner and outer rings 10, 12. The raceways 40, 42 face each other in the radial direction. The row of radial rollers 22 is radially offset inwards with respect to the rows of axial rollers 18, 20. The rolling surface of each radial roller 22 is in radial contact with the raceways 40, 42. The row of radial rollers 22 is axially located between the rows of axial rollers 18, 20.

The inner ring 10 comprises an annular groove 44 opening in a radial direction outwardly towards the outer ring 12. The inner ring 10 comprises an outer stepped cylindrical surface 10a from which the groove 44 is formed. As previously mentioned, the inner ring 10 is divided in the axial direction in two separate parts, the first ring 14 and the second ring 16. The first and second rings 14, 16 delimit together the groove 44.

The inner ring 10 comprises the outer surface 10a. The inner ring 10 also comprises an inner cylindrical bore 10b which is radially opposite to the outer surface 10a. The inner ring 10 further comprises two opposite first and second frontal faces 10c, 10d which axially delimit the outer surface 10a and the bore 10b.

The outer ring 12 comprises an annular protruding nose 46 engaging into the annular groove 44 of the inner ring. The nose 46 extends radially inwards. The nose 46 protrudes radially from an inner stepped surface or bore 12a of the outer ring.

The outer ring 12 also comprises an outer cylindrical surface 12b which is radially opposite to the bore 12a. In the illustrated example, the outer surface 12b is provided with a gear teeth (not referenced). The outer ring 12 further comprises two opposite first and second frontal faces 12c, 12d which axially delimit the outer surface 12b and the bore 12a.

In the illustrated example, the outer ring 12 is made in one part. Alternatively, the outer ring 12 may be formed in at least two separate parts secured together.

The rows of axial rollers 18, 20 are arranged axially between the nose 46 of the outer ring and the groove 44 of the inner ring. The rows of axial rollers 18, 20 are disposed on each side of the nose 46. The radial raceways 34, 38 are located on the nose 46. The radial raceways 32, 36 are located on the groove 44.

The row of radial rollers 22 is arranged radially between the nose 46 of the outer ring and the groove 44 of the inner ring. The axial raceways 40, 42 are respectively located on the groove 44 and the nose 46. An inner cylindrical surface or bore of the nose 46 delimits the axial raceway 42. An axial bottom of the groove 44 delimits the axial raceway 40. The axial raceway 40 radially faces the inner cylindrical bore of the nose 46 onto which is formed the axial raceway 42.

The rolling bearing also comprises cages 48, 50 for maintaining the axial rollers 18, 20 spaced apart in the circumferential direction. Each cage 48, 50 is segmented and is formed by a plurality of successive cage segments abutting in the circumferential direction one relative to the other. Each cage 48, 50 is formed as a split cage. In this example, the rolling bearing does not comprise such a cage for the radial rollers 22.

The radial rollers 22 comes into contact with each other in the circumferential direction.

As previously mentioned, the rolling bearing comprises the first and second row of radial rollers 24, 26 arranged between the inner and outer rings 10, 12.

The rollers 24, 26 of one row are identical to one another. Each roller 24, 26 comprises a cylindrical outer rolling surface. Each roller 24, 26 further comprises two opposite frontal end faces delimiting the outer rolling surface. The axis of rotation of each roller 24, 26 is parallel to the axis of the bearing and parallel to the axes of the rollers 22.

The radial rollers 24 are arranged axially between the row of axial rollers 18 and the frontal faces 10c, 12c of the inner and outer rings. The row of radial rollers 24 is radially offset outwards with respect to the rows of axial rollers 18, 20.

The radial rollers 24 are interposed radially between annular axial raceways 52, 54 respectively formed on the inner and outer rings 10, 12. The raceways 52, 54 face each other in the radial direction. The raceway 52 is formed on the outer surface 10a of the inner ring. The raceway 52 is axially offset outwards with respect to the radial raceway 32 for the rollers 18. The raceway 54 is formed on the inner bore 12a of the outer ring. The rolling surface of each radial roller 24 is in radial contact with the raceways 52, 54. The radial rollers 24 come into contact with each other in the circumferential direction. Thus, the rolling surfaces of the radial rollers 24 come into contact with each other in the circumferential direction.

The radial rollers 24 are located axially between radial shoulders 56, 58 respectively formed on the inner and outer rings 10, 12. The shoulders 56, 58 face each other in the axial direction. Each shoulder 56, 58 is straight and disposed perpendicular to the corresponding raceway 52, 54. Each shoulder 56, 58 extends radially from the corresponding raceway 52, 54. The end faces of the rollers 24 may bear against the shoulders 56, 58.

The raceway 52 and the shoulder 56 of the inner ring define together with the raceway 54 and the shoulder 58 of the outer ring an annular space inside which the radial rollers 24 are housed.

The radial rollers 26 are arranged axially between the row of axial rollers 20 and the frontal faces 10d, 12d of the inner and outer rings. The row of radial rollers 26 is radially offset outwards with respect to the rows of axial rollers 18, 20. In the illustrated example, the row of radial rollers 26 is radially offset inwards with respect to the row of radial rollers 24. Alternatively, the row of radial rollers 26 may be radially offset outwards with respect to the row of radial rollers 24, or may be symmetric to the row of radial rollers 24 with regard to a radial plane of the rolling bearing.

The radial rollers 26 are interposed radially between annular axial raceways 62, 64 respectively formed on the inner and outer rings 10, 12. The raceways 62, 64 face each other in the radial direction. The raceway 62 is formed on the outer surface 10a of the inner ring. The raceway 62 is axially offset outwards with respect to the radial raceway 36 for the rollers 20. The raceway 64 is formed on the inner bore 12a of the outer ring. The rolling surface of each radial roller 26 is in radial contact with the raceways 62, 64. The radial rollers 26 come into contact with each other in the circumferential direction. Thus, the rolling surfaces of the radial rollers 26 come into contact with each other in the circumferential direction.

The radial rollers 26 are located axially between radial shoulders 66, 68 respectively formed on the inner and outer rings 10, 12. The shoulders 66, 68 face each other in the axial direction. Each shoulder 66, 68 is straight and disposed perpendicular to the corresponding raceway 62, 64. Each shoulder 66, 68 extends radially from the corresponding raceway 62, 64. The end faces of the rollers 26 may bear against the shoulders 56, 58.

The raceway 62 and the shoulder 66 of the inner ring define together with the raceway 64 and the shoulder 68 of the outer ring an annular space inside which the radial rollers 26 are housed.

Considering the cross-section of FIG. 1, if a tilting moment acts on the rolling bearing in the clockwise direction, the roller 26 located on the upper side of FIG. 1 and the roller 24 located on the lower side prevent an angular displacement of the outer ring 12 relative to the inner ring 10. If a tilting moment acts on the rolling bearing in the counterclockwise direction, the roller 24 located on the upper side of FIG. 1 and the roller 26 located on the lower side prevent an angular displacement of the outer ring 12 relative to the inner ring 10.

Figure 2:
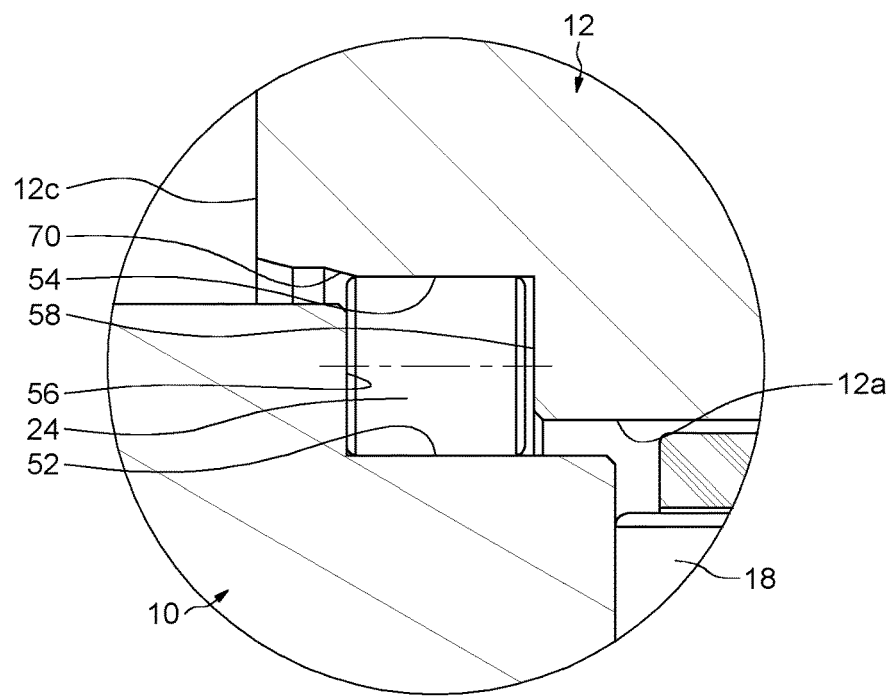
FIGS. 2 and 3 are detail views of FIG. 1.

As shown more clearly on FIG. 2, a chamfer 70 is provided on the bore 12a of the outer ring in the junction zone between this bore and the frontal face 12c. The shape of the chamfer 70 is foreseen for easier mounting of the outer ring 10 on the first ring 14 of the inner ring during assembly.

Figure 3:
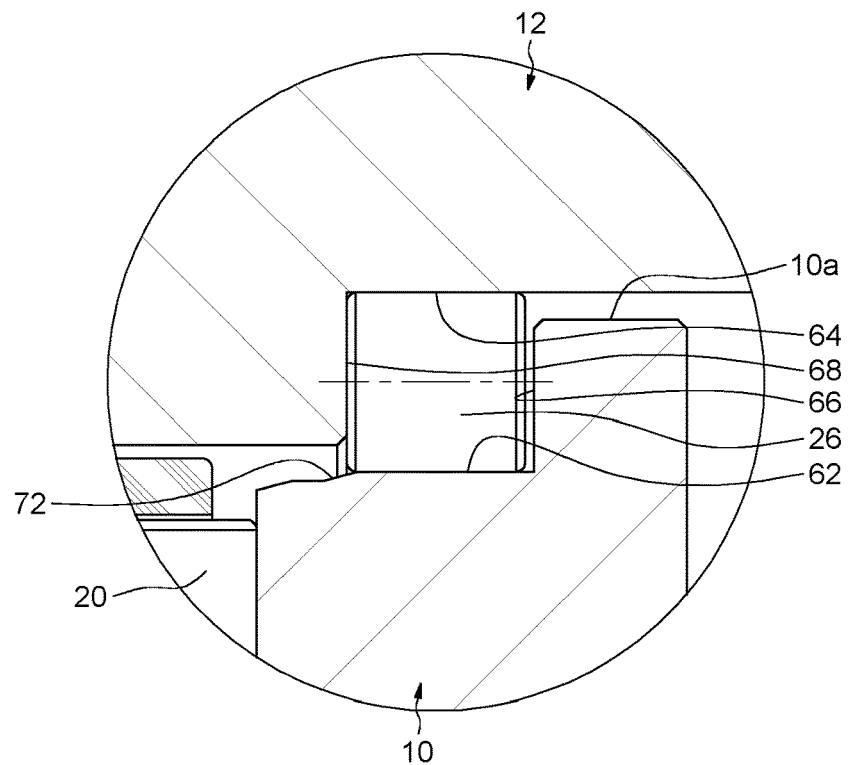

Similarly, as shown more clearly on FIG. 3, a chamfer 72 is provided on the outer surface 10a of the inner ring in the junction zone between the raceways 36 and 62. The shape of the chamfer 72 is foreseen for easier mounting of the second ring 16 of the inner ring inside the outer ring 10 during assembly.

The rolling bearing may be mounted as follows. In a first step, the first ring 14 of the inner ring already provided with the rows of rollers 24, 18 is mounted inside the outer ring. Then, in a second step, the row of rollers 22 is mounted on the first ring 14 of the inner ring, and the rows of rollers 20, 26 are mounted on the outer ring. Finally, in a third step, the second ring 16 of the inner ring is mounted inside the outer ring 10 in axial contact with the first ring 14.

Figure 4:
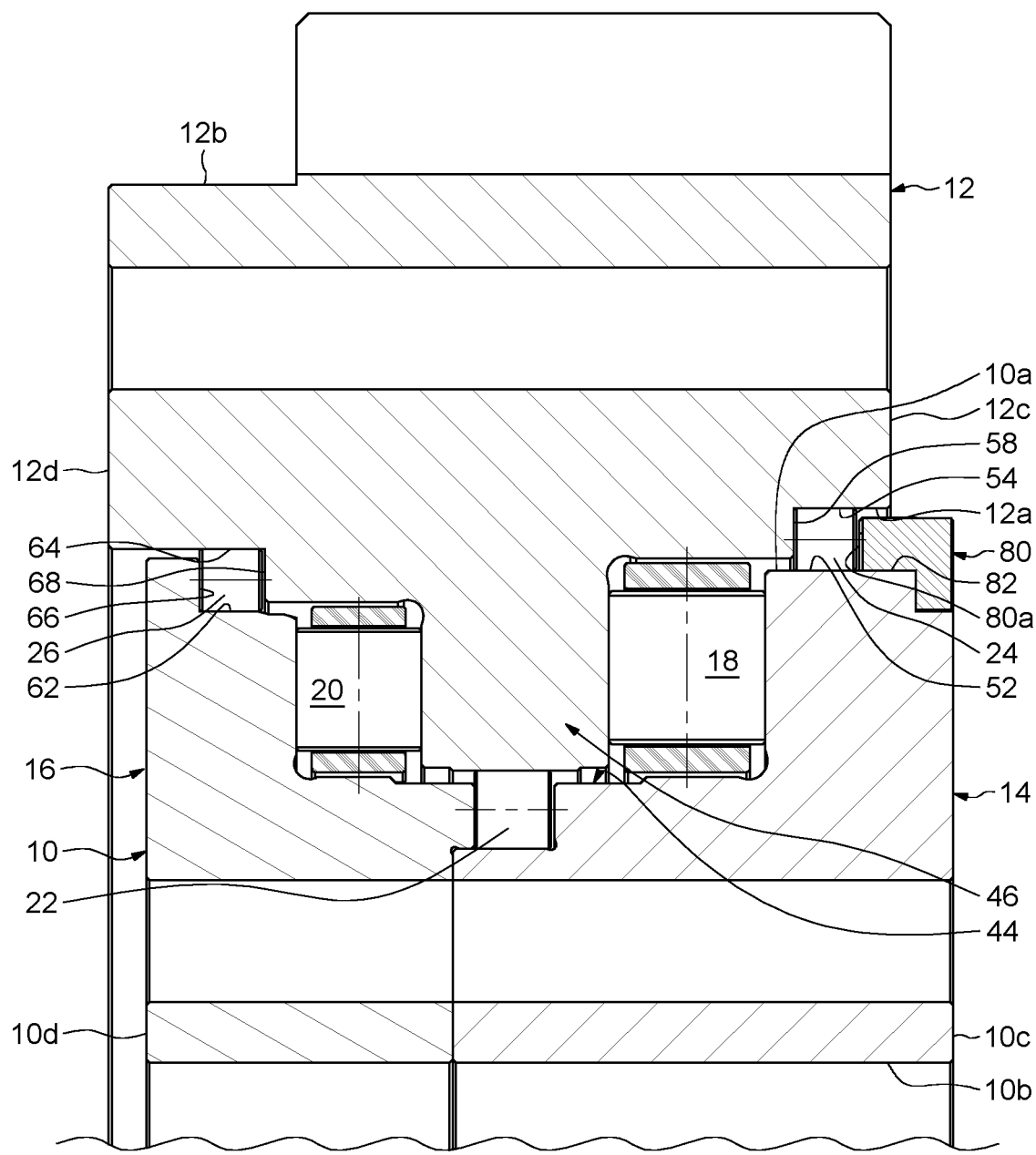
FIG. 4 is a partial cross-section of a rolling bearing according to another example of the invention.
Figure 5:
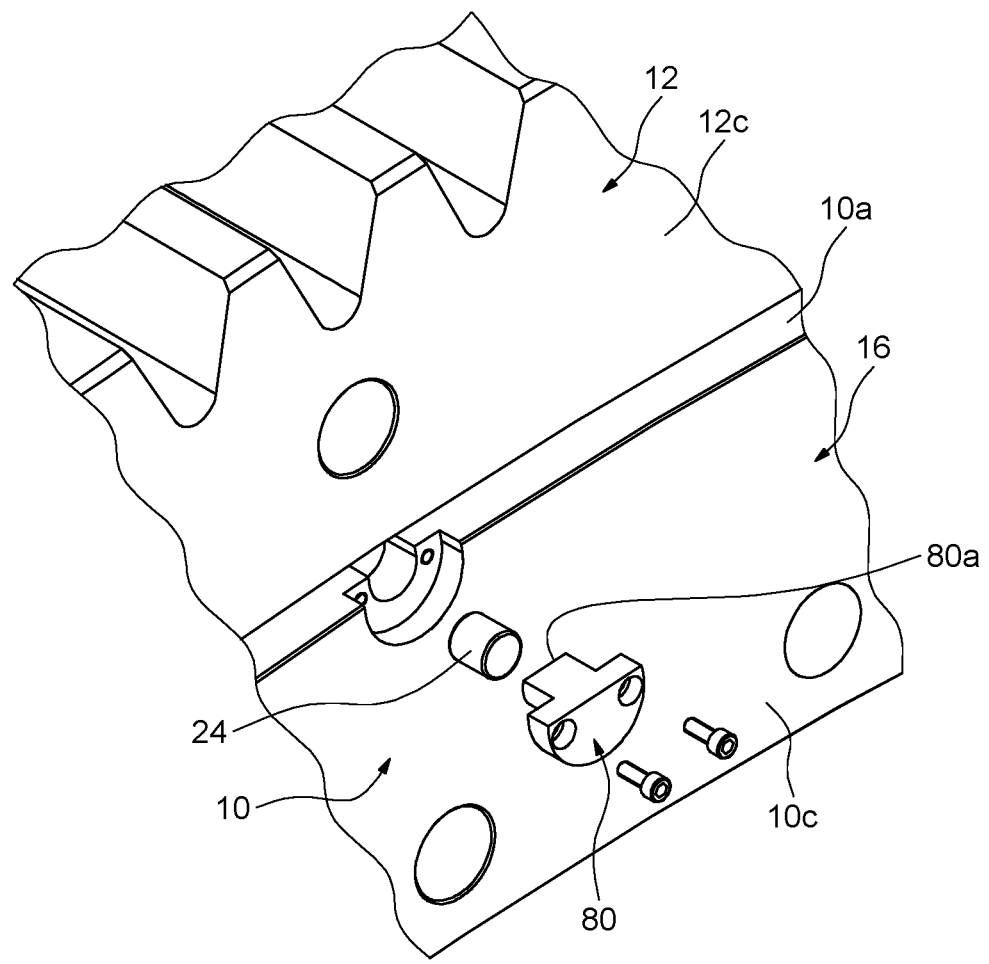
FIG. 5 is a partial exploded perspective view of FIG. 4.

The example shown on FIGS. 4 and 5, in which identical parts are given identical references, differs from the first example in that the rolling bearing further comprises a plug 80 secured to the inner ring 10 in order to facilitate the mounting of the row of radial rollers 24. In the illustrated example, the plug 80 is secured to the first ring 14 of the inner ring. An orifice 82 is formed both on the outer surface 10a and the frontal face 10c of the inner ring and is closed by the plug 80. The orifice 82 extends axially from the frontal face 10c and opens on the radial shoulder 56 (FIG. 1) of the inner ring.

The plug 80 is removably secured to the inner ring 10, here by screwing. The plug 80 is provided with a radial end face 80a which is flush with the radial shoulder 56 of the inner ring so as to prevent surface discontinuity. The orifice 82 enables the introduction of the radial rollers 24 inside the bearing.

With such design with the orifice 82, no chamfer is provided on the outer surface 10a of the inner ring in the junction zone between the raceways 36 and 62 as it is the case in the first example.

The rolling bearing may be mounted as follows. In a first step, the second ring 16 of the inner ring already provided with the rows of rollers 26, 20 is mounted inside the outer ring. Then, in a second step, the row of rollers 22 is mounted on the second ring 16 of the inner ring, the row of rollers 18 is mounted on the outer ring, and the first ring 14 of the inner ring is mounted inside the outer ring 10 in axial contact with the second ring 16.

Then, in a third step, the row of rollers 24 is introduced between the inner and outer rings 10, 12 through the orifice 82. Finally, in a fourth step, the plug 80 is secured to the inner ring 10.

In the illustrated example, the inner ring 10 comprises only one orifice 82 and one associated plug 80 for the introduction of the rollers 26. Alternatively, the inner ring 10 may comprise a plurality of orifices and associated plugs spaced apart in the circumferential direction for the introduction of the rollers 24. In another variant, it could also be possible to provide plugs both on the first ring 14 and the second ring 16 of the inner ring for the introduction of the rollers 24, 26.

Otherwise, as previously mentioned, in this illustrated example, the first ring of the rolling bearing is the inner ring 10 whereas the second ring is the outer ring 12.

As an alternative, it could be possible to provide a reversed arrangement with the first ring forming the outer ring and the second ring forming the inner ring. In this case, the groove formed on the outer ring opens radially inwards and the nose of the inner ring extends radially outwards.

In the illustrated examples, the rolling bearing is provided with three rows of rolling elements 18, 20, 22 axially located between the rows of radial rollers 24, 26. Alternatively, the rolling bearing may comprise only two rows of rolling elements, or four or more rows of rolling elements, axially located between the rows of radial rollers 24, 26. In the illustrated example, the rolling elements 18, 22 are rollers. The rolling bearing may comprise other types of rolling elements 18 and 22, for example balls.

In the illustrated examples, the rolling bearing is provided, axially on each side, with one row of radial rollers 24, 26. Alternatively, the rolling bearing may be provided, axially on each side, with more rows of radial rollers. In the illustrated example, the rolling elements 24, 26 are rollers. The rolling bearing may comprise other types of rolling elements 24, 26, for example balls.

The invention claimed is:

1. A rolling bearing having a first axial bearing end and a second axial bearing end, the rolling bearing comprising:
   a first ring having a first axially extending first ring raceway, a second axially extending first ring raceway, a third axially extending first ring raceway, and a first radially extending first ring raceway thereon,
   a second ring capable of rotating concentrically relative to the first ring, the second ring having a protruding nose located medially in an axial direction,
   wherein the protruding nose extends radially toward the first ring to form a distal end thereof and having a first lateral side, the distal end having a first axially extending second ring raceway thereon, the first lateral side forming a first radially extending second ring raceway thereon,
   the second ring having a second axially extending second ring raceway and a third axially extending second ring raceway,
   at least one row of radial rolling elements radially interposed between the first axially extending second ring raceway and the first axially extending first ring raceway, and
   at least one row of axial rolling elements axially interposed between the first radially extending first ring raceway and the first radially extending second ring raceway, and
   at least one row of rolling elements located axially closest to the first axial bearing end relative to any other rolling elements and between the second axially extending first ring raceway and the second axially extending second ring raceway,
   at least one row of rolling elements located axially closest to the second axial bearing end relative to any other rolling elements and between the third axially extending first ring raceway and the third axially extending second ring raceway.

2. The rolling bearing according to claim 1, further comprising: the first ring having a second radially extending first ring raceway, the protruding nose having a second lateral side forming a second radially extending second ring raceway, a second row of the at least one row of axial rolling elements axially interposed between the second radially extending first ring raceway and the second radially extending second ring raceway, the rows of axial rolling elements being spaced apart from each other in the axial direction.

3. The rolling bearing according to claim 2, wherein the at least one row of radial rolling elements is arranged axially between the at least one row of axial rolling elements and the second row of the at least one row of axial rolling elements.

4. The rolling bearing according to claim 1, wherein the at least one row of rolling elements located axially closest to the first axial bearing end and the at least one row of rolling elements located axially closest to the second axial bearing end are radially offset with respect to the at least one row of axial rolling elements.

5. The rolling bearing according to claim 1, wherein the at least one row of radial rolling elements, the at least one row of axial rolling elements, the at least one row of rolling elements located axially closest to the first axial bearing end, and the at least one row of rolling elements located axially closest to the second axial bearing end comprise radial cylindrical rollers.

6. The rolling bearing according to claim 1, wherein the at least one row of rolling elements located axially closest to the first axial bearing end and the at least one row of rolling elements located axially closest to the second axial bearing end are located axially between shoulders of the first and second rings.

7. The rolling bearing according to claim 6, wherein the first ring is provided with at least one plug extending into an orifice formed on the first ring and provided with an end face which is flush with one of the radial shoulders of the first ring.

* * * * *